Figure 1:
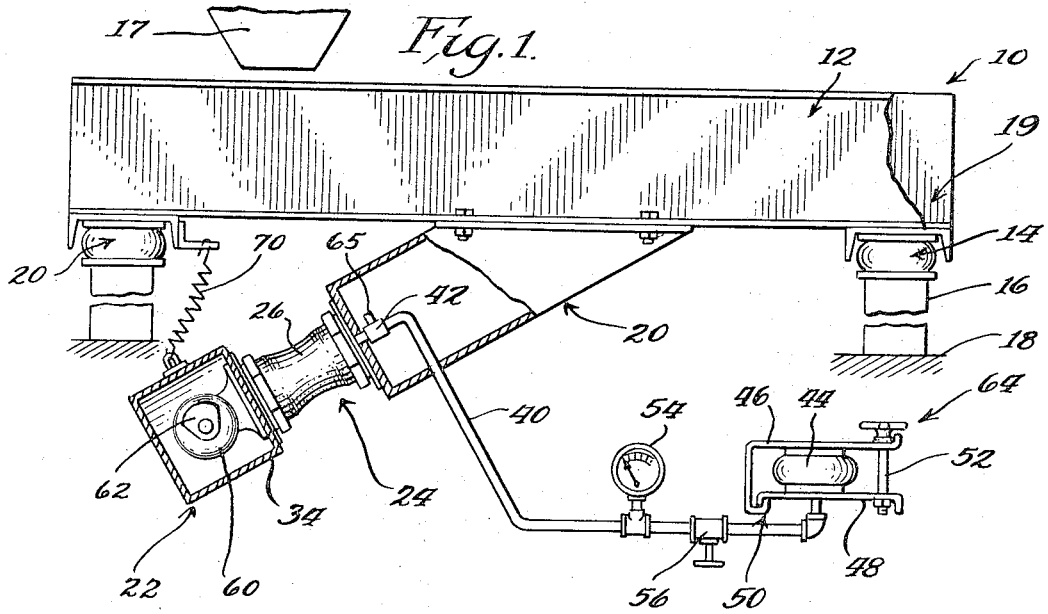

Aug. 29, 1967 R. M. CARRIER, JR 3,338,384
LIQUID MOUNT TUNABLE VIBRATING DEVICE FOR NATURAL
FREQUENCY VIBRATING CONVEYORS
Filed July 13, 1965

Inventor
Robert M. Carrier, Jr.

By Mann, Brown & McWilliams
Attys.

United States Patent Office 3,338,384
Patented Aug. 29, 1967

3,338,384
LIQUID MOUNT TUNABLE VIBRATING DEVICE FOR NATURAL FREQUENCY VIBRATING CONVEYORS
Robert M. Carrier, Jr., 3100 Upper River Road, Louisville, Ky. 40207; Louisville Trust Company, Elizabeth D. Carrier, Patrick H. Mitchell, and A. D. Stevens, executors and trustees of said Robert M. Carrier, Jr., deceased
Filed July 13, 1965, Ser. No. 471,696
7 Claims. (Cl. 198—220)

My invention relates to a tunable vibrating device arrangement, and more particularly, to a vibrating apparatus of the natural frequency type adaptable for performing one of the conveying, screening, or other handling operations customarily associated with bulk materials.

A principal object of my invention is to provide a novel liquid mount arrangement for securing constant speed exciters to vibratory members of natural frequency vibrating equipment that provides a novel tension-compression direct resilient connection between these parts, and in which the nature of the mount may be adjusted to adjust the tuning of the system and thereby control the throw and thus the rate of feed of the vibratory equipment.

Other objects of the invention are to provide a hermetically sealed liquid filled exciter mount arrangement for vibratory apparatus such as vibrating feeders, to provide for ready tuning of apparatus of this type, and to provide apparatus of the type described that is economical to manufacture, convenient in use, and adaptable to a wide variety of applications.

Other objects, uses, and advantages will be obvious or become apparent from a consideration of the following detailed description and the application drawing.

Figure 2:
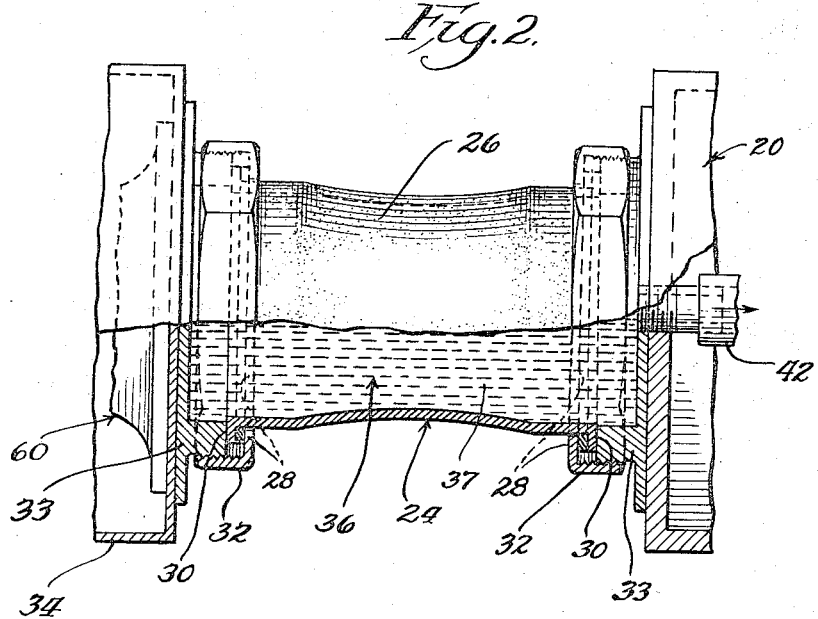

In the drawing:

FIGURE 1 is a diagrammatic side elevational view illustrating a vibrating conveyor arranged in accordance with this invention; and FIGURE 2 is an enlarged fragmental plan view of the liquid mount that connects the exciter to the conveyor, parts being broken away to expose other parts.

However, it is to be distinctly understood that the specific drawing illustrations provided are supplied primarily to comply with the requirements of the patent code, and that the invention may have many other specific embodiments, all of which are intended to be covered by the appended claims.

Reference numeral 10 of FIGURE 1 generally indicates one embodiment of my invention as the invention may be applied to a vibrating feeder arrangement in which a trough 12 is resiliently mounted or supported on suitable air springs 14 that are in turn supported on posts 16 that rest on the floor 18 of the plant site at which the apparatus 10 is located. Feeder 10 controls the discharge of bulk material from a hopper 17 and discharges at the trough open end 19.

The air bags 14 may be of any suitable type, and for purposes of this invention they may be eliminated in favor of coil springs or other suitable resilient suspending or mounting devices.

The trough 12 on its undersurface is provided with the familiar angled spring seat structure 20, to which is connected a constant speed exciter 22.

In accordance with my invention, the constant speed exciter 22 is directly connected to the spring seat structure 20 by the liquid filled mount device generally indicated by reference numeral 24.

As indicated in FIGURE 2, the liquid filled mount device 24 comprises a resilient bag member 26 that in the form shown is substantially cylindrical though slightly involute or concave in longitudinal cross-sectional configuration, and which has its ends 28 appropriately sealed against leakage, as by being clamped in liquid tight sealing relation with suitable seats 30 by the respective clamping collars or bead plater 32. In the form shown, the seats 30 are a part of end plate members 33 which are affixed to the spring seat 20 and exciter housing 34 in any suitable manner.

In accordance with this invention, the chamber 36 defined by the bag 26 is filled with a suitable non-compressible liquid 37, such as oil, and the pressure of the oil within chamber 36 is varied to tune the vibratory system made up by the trough 12, its resilient support, the exciter device 22, and the liquid filled mount device 24.

This pressure adjustment may be accomplished in any suitable manner, but in the form shown I have illustrated a conduit 40 extending between a fitting 42 at the spring seat 20 and a liquid filled resilient bag 44 located at a point remote from the liquid mount device 24 and interposed between a pair of clamping arms 46 and 48 which may be hinged together in any suitable manner where indicated at 50 and drawn into clamping engagement with the bag 44 by tightening the clamping bolt 52.

A pressure gauge 54 may be provided in line 40 to indicate pressure and a suitable off-on valve 56 may be employed so that the vibration imposed on the liquid may be isolated from bag 44 during normal operation of the device 10. Conduit 40 should be formed from copper or a suitable stretch or expansion resisting plastic material that is flexible laterally thereof.

In a commercial form of the illustrated embodiment, the exciter device 22 comprises a suitable motor 60 that rotates an eccentric 62, preferably at a constant speed on the order of 900 r.p.m.

In accordance with this invention, the clamping device 64, which comprises the bag 44, the clamping members 46 and 48, and the clamp screw 52, is employed to apply pressure to the liquid filled bag 44 to change the pressure of the liquid within the bag 26. Preferably, all of the space within the bag 26, conduit 40, and bag 44 is filled with hydraulic liquid, and it is desired that all of these components be hermetically sealed in some suitable manner against hydraulic leakage. A bleeder 65 may be provided at fitting 42 to permit air to escape when bag 26 is filled with liquid.

In operation, I prefer to vary the pressure within bag 26 between zero and about eighty pounds per square inch by operating remote control clamping device 64 to vary the throw of the vibratory system involved between zero and the maximum permitted by the system. In a specfic commercial embodiment, the bag 26 has a length on the order of 5½ inches and provides a maximum stroke of ½ inch under the maximum pressure conditions indicated.

This adjustability of the liquid mount 24 permits the vibratory system to be tuned to a spring rate approximating, but preferably not exactly equal to, the operating speed of the constant speed exciter 22. In the liquid mount arrangement of this invention, under zero pressure conditions in bag 26 the throw is zero, while at the indicated maximum pressure condition the throw of the conveyor is at its maximum as the system is approximately tuned within operating speed of exciter 22.

It will also be noted that the liquid mount device 24 directly connects the exciter 22 to the spring seat structure, 20, and consequently under the vibrating action of the exciter, the mount device 24 contracts and extends in performing its function of transmitting the vibratory effect of the exciter to the member 12. It is thus a tension-compression type resilient member and combines in one resilient unit the functions of the heretofore required pair of air bag devices that are now known to the prior art.

Furthermore, since the liquid within the bag 26 is substantially incompressible, it is the material of the bag 26 itself that flexes under the vibratory action of exciter 22 and it does this by stretching and contracting under the vibratory action generated by exciter 22. Consequently, the bag 26 should be made from a resiliently flexible material such as rubber.

As indicated in FIGURE 1, a suitable spring 70 may be employed to support exciter 22 in longitudinal alignment with the spring seat structure 20.

While only a single mount device 24 is employed between exciter 22 and spring seat structure 20, it should be understood that several of such mounts may be employed, but they should operate in parallel between the exciter 22 and seat structure 20, and not in series. In such an arrangement, the housing 34 should be of sufficient diameter transversely of trough 12 to accommodate two or more mounts 24 in side by side relation. Of course, suitable additional conduiting is also required to connect the additional bags 26 to bag 44.

It will therefore be seen that I have provided a unique and simplified tunable resilient mounting arrangement for securing exciters to vibrating feeders and the like that eliminates the leakage problems inherent in gas filled systems and provides a hermetically sealed control system that will have uniform characteristics throughout the useful life of the apparatus.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:
1. Apparatus for handling bulk materials comprising:
   a resiliently supported bulk material receiving member to be vibrated,
   an exciter device for vibrating said member,
   and resilient means for connecting said exciter device to said member,
   said resilient means comprising a liquid filled resilient bag connected at one end thereof to said exciter device and connected at the other end thereof to said member,
   and means for regulating the pressure of the liquid in said bag.

2. Natural frequency vibrating apparatus for handling bulk material comprising:
   a resiliently supported bulk material receiving member adapted to be vibrated to convey the material longitudinally thereof,
   a constant speed exciter device for vibrating said member,
   and a resilient device for connecting said exciter device to said member,
   said resilient device comprising a liquid filled resilient bag connected at one end thereof to said member at a relatively acute angle with respect thereto and connected directly to said exciter device,
   said bag being filled with a substantially incompressible liquid,
   and means for regulating the pressure of said liquid in said bag to adjust the spring rate of the vibratory system to approximately the speed of said exciter.

3. The apparatus set forth in claim 2 wherein:
   said regulating means comprises
   a liquid filled pressure adjusting bag remote from said resilient bag,
   conduit means connecting said bags into a hermetically sealed hydraulic system,
   and means for adjustably compressing said pressure adjusting bag to vary the pressure of said liquid in said resilient bag.

4. In a vibratory apparatus of the natural frequency type for handling bulk material of the type including a resiliently mounted bulk material receiving member adapted to be vibrated to convey the material in a predetermined direction, a constant speed exciter device for vibrating said member, and a tunable resilient device for connecting the exciter device to the member and cooperating with said exciter device and said member to form a vibrating system, the improvement wherein said resilient device comprises:
   a single liquid filled bag connected directly between said member and said device,
   said bag being filled with a substantially incompressible liquid,
   and means for regulating the pressure of said liquid in said bag to vary the amplitude of vibration of said system.

5. The improvement set forth in claim 4 wherein said regulating means and said bag comprise a hermetically sealed system.

6. The improvement set forth in claim 4 wherein said bag is substantially cylindrical in longitudinal configuration.

7. Natural frequency vibrating apparatus for conveying bulk materials, said apparatus comprising:
   a resiliently mounted bulk materials receiving member adapted to be vibrated to convey the material in a predetermined direction,
   an exciter device for vibrating said member,
   and mounting means for connecting said exciter device to said member,
   said mounting means including compression-tension resilient means vibrating under the action of said exciter device in a plane positioned at an acute angle with respect to said member for vibrating said member in a bulk material conveying manner and forming the support of said exciter device from said member,
   said resilient means comprising a liquid filled resilient bag connected at one end thereof to said exciter device and connected at the other end thereof to said member,
   and means for regulating the pressure of the liquid in said bag for adjusting the spring rate of the vibrating system comprising said member, said exciter device and said mounting means.

References Cited

UNITED STATES PATENTS

| | | | |
|---|---|---|---|
| 333,834 | 1/1886 | Corliss | 60—54.5 |
| 1,459,317 | 6/1923 | Birdsall | 60—54.5 |
| 1,549,459 | 8/1925 | Davis | 60—54.5 |
| 3,089,582 | 5/1963 | Musschoot et al. | 198—220 |
| 3,095,747 | 7/1963 | Morris | 74—61 X |
| 3,112,823 | 12/1963 | Musschoot et al. | 198—220 |

EVON C. BLUNK, *Primary Examiner.*

EDWARD A. SROKA, *Assistant Examiner.*